Jan. 27, 1953  E. B. TIDD  2,626,755
HEATING SYSTEM WITH OUTDOOR CONTROL
Filed June 24, 1947  7 Sheets-Sheet 1
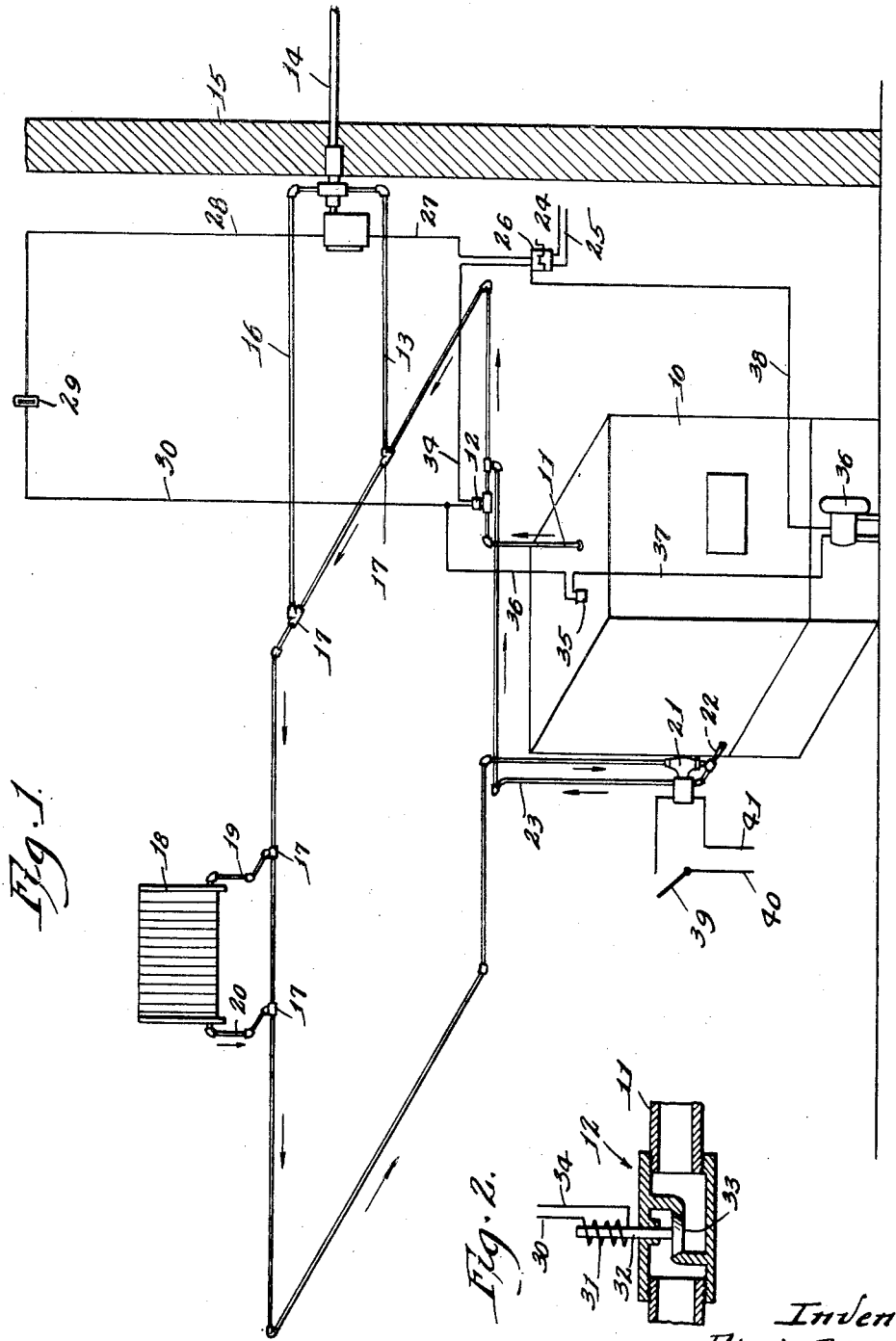
Inventor:
Edwin B. Tidd.
By John M. Darley
Attorney.

Jan. 27, 1953  E. B. TIDD  2,626,755
HEATING SYSTEM WITH OUTDOOR CONTROL
Filed June 24, 1947  7 Sheets-Sheet 2

Inventor:
Edwin B. Tidd.
By John M Darley
Attorney.

Jan. 27, 1953          E. B. TIDD          2,626,755
HEATING SYSTEM WITH OUTDOOR CONTROL
Filed June 24, 1947          7 Sheets-Sheet 3
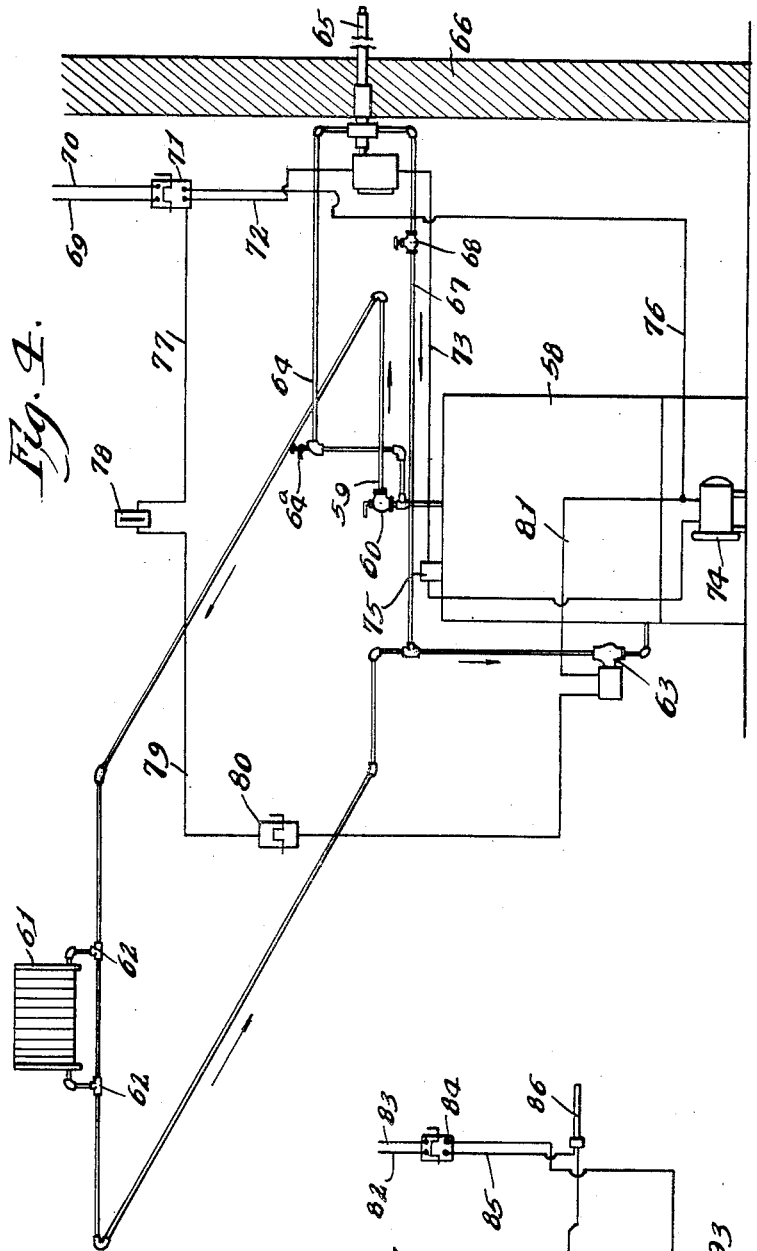
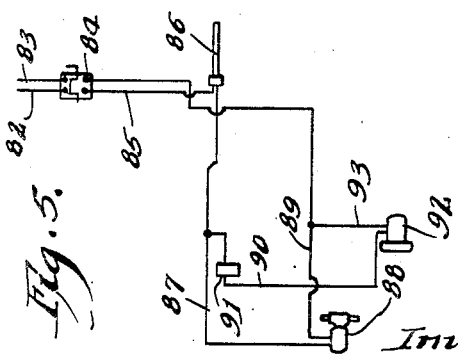
Inventor.
Edwin B. Tidd.
By
Attorney.

Jan. 27, 1953 E. B. TIDD 2,626,755
HEATING SYSTEM WITH OUTDOOR CONTROL
Filed June 24, 1947 7 Sheets-Sheet 4
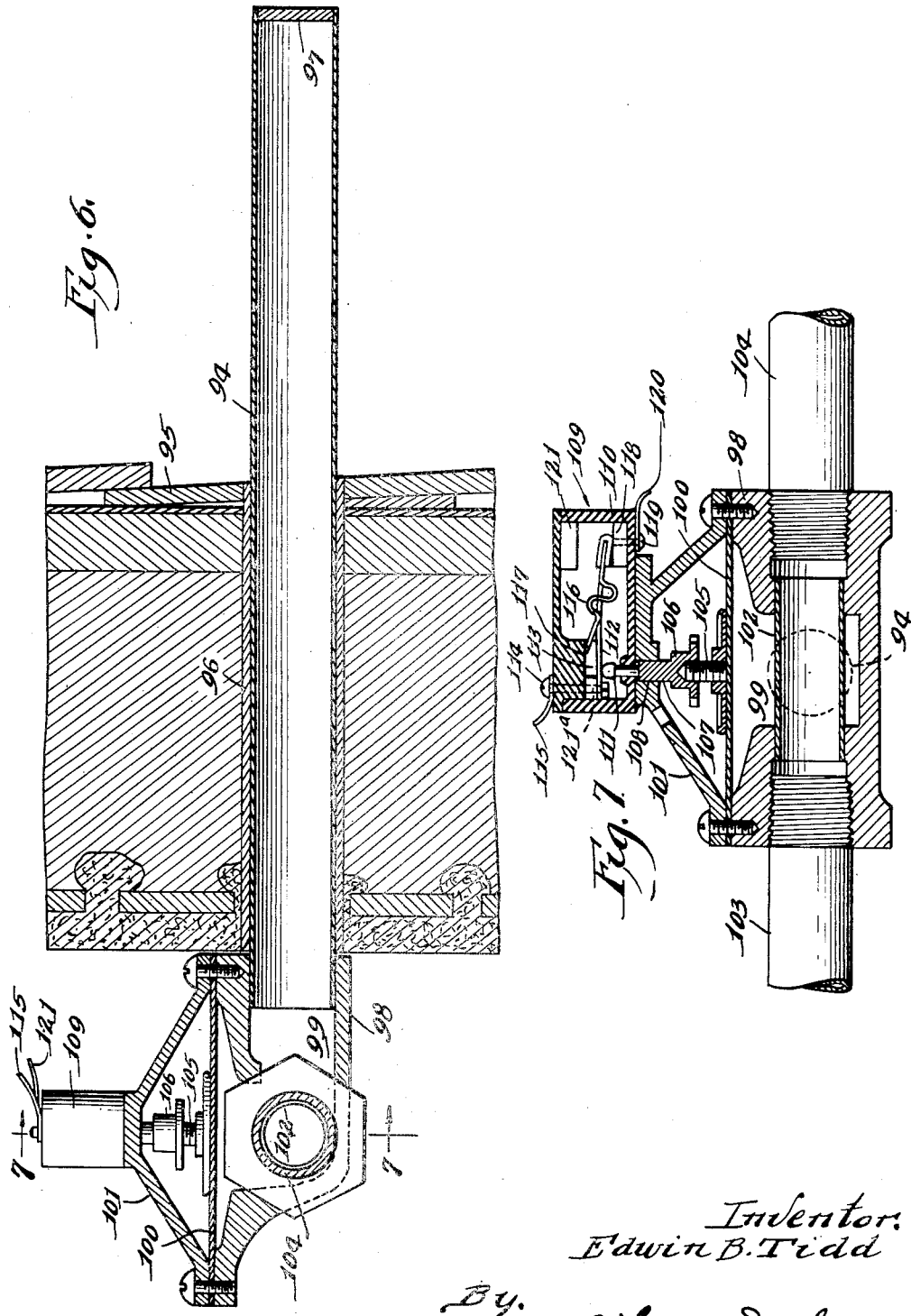
Inventor:
Edwin B. Tidd
By John M. Darley
Attorney.

Jan. 27, 1953      E. B. TIDD      2,626,755
HEATING SYSTEM WITH OUTDOOR CONTROL
Filed June 24, 1947      7 Sheets-Sheet 5
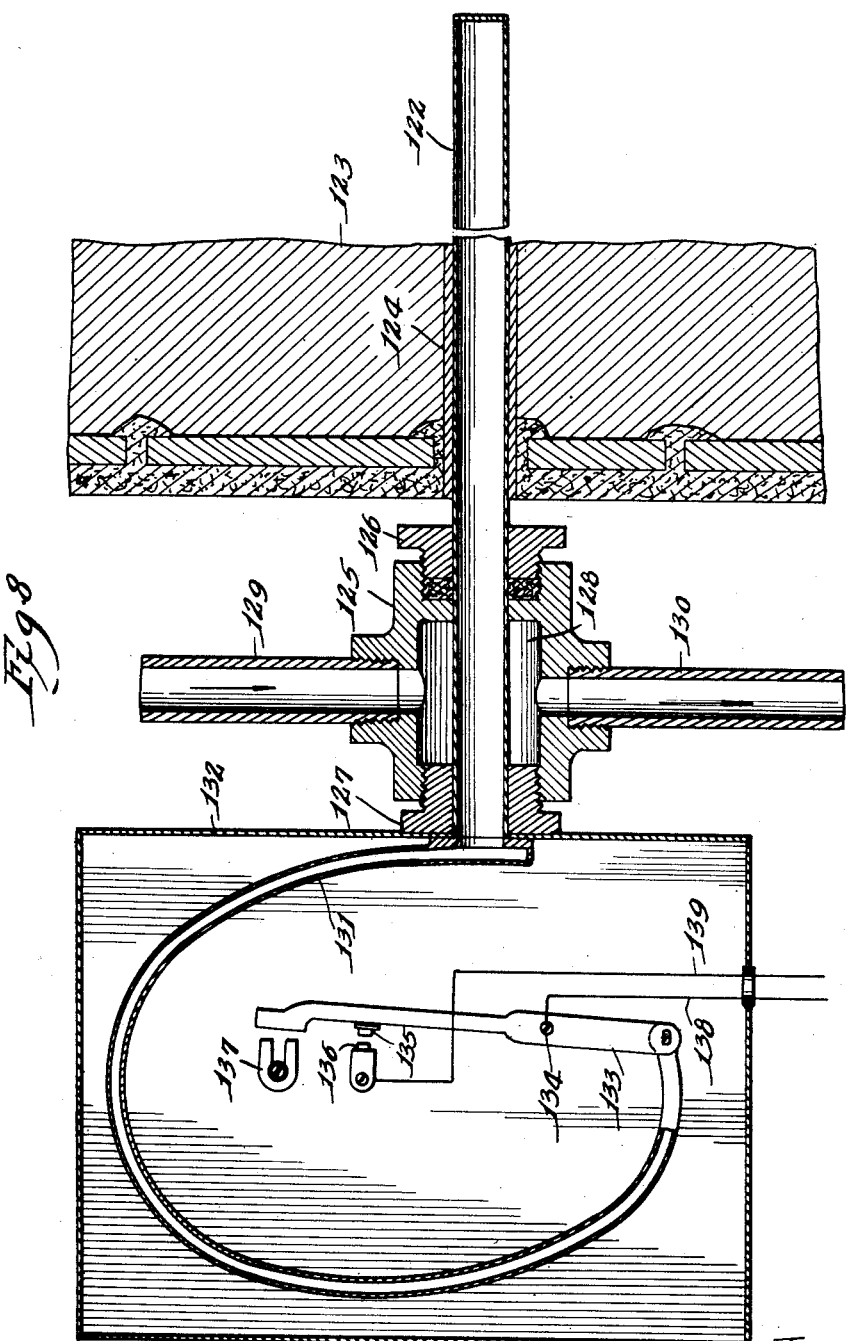
Inventor.
Edwin B. Tidd.
By John W Darley
Attorney.

Jan. 27, 1953 E. B. TIDD 2,626,755
HEATING SYSTEM WITH OUTDOOR CONTROL
Filed June 24, 1947 7 Sheets-Sheet 6

Inventor.
Edwin B. Tidd.
By. John M. Darley
Attorney.

Jan. 27, 1953 — E. B. TIDD — 2,626,755
HEATING SYSTEM WITH OUTDOOR CONTROL
Filed June 24, 1947 — 7 Sheets-Sheet 7

Inventor:
Edwin B. Tidd.
By John M Darley
Attorney.

Patented Jan. 27, 1953

2,626,755

UNITED STATES PATENT OFFICE 2,626,755

HEATING SYSTEM WITH OUTDOOR CONTROL

Edwin B. Tidd, Mount Prospect, Ill., assignor to Bell & Gossett Company, Morton Grove, Ill., a corporation of Illinois Application June 24, 1947, Serial No. 756,615

8 Claims. (Cl. 237—8)

My invention relates to heating systems and more particularly to a construction and arrangement thereof which efficiently and economically maintains a substantially uniform temperature in the space to be heated, regardless of variations in the external weather conditions.

For purpose of disclosure, the invention will be described in connection with a forcibly circulated, hot water heating system, but it will be understood that the invention is applicable to any fluid heated system, including those utilizing hot air and steam, and without regard to the method of firing the heat source, i. e., boiler or furnace. The latter, regarded generally as a reservoir of heating medium, may therefore be fired with liquid, gaseous or solid fuels and, in the case of solid fuels, the firing may be by hand or automatically controlled.

To insure maximum body comfort in any given space, it is important that the heating system maintain a substantially constant temperature condition in the space. In other words, the temperature throughout a room should be as nearly uniform as possible so that there will be a minimum temperature differential between the floor and the ceiling. During the heating season, every such space is subject to a heat loss which varies with changes in the external weather conditions and unless this loss is compensated by a heat supply under conditions of continuous balance, it is obvious that the space will not be heated properly. Factors which influence this loss for any given installation are the outdoor temperature, rain, snow, sun and wind. The heat loss therefore will be greater during periods of severe weather than on mild days and, importantly, as between windy and still days having the same temperature, the heat loss will be greater on the windy days. Hence, a heating system which is not sufficiently flexible to handle these variables will fall short of providing adequate heat under all conditions.

The problem involved can be readily understood by considering the limitations of a common type of forcibly circulated, hot water heating system. A minimum temperature is maintained in the boiler of such a system of an "aquastat" connected to the firing device and the pump is controlled by a room thermostat set to theoretically maintain a desired temperature in the space being heated. Heat supply to the space is therefore intermittent and this condition renders impossible any close regulation of the desired temperature. Not only is there a considerable lag between the heating of the radiators and the response of the thermostat, but the inertia of the system is such that when the thermostat opens, the radiators have been heated to a temperature higher than the conditons require, thus resulting in a waste of heat. Moreover, when the pump stops, the convection circulation of air in the room gradually slows down and the air stratifies. If, for example, the thermostat is set for 70° F., the temperature at the level of the thermostat may be of this order, but near the ceiling the temperature will be several degrees higher and near the floor the temperature will be several degrees lower. This condition, known as "cold 70°," is objectionable in that it produces body discomfort and is not rectified until air circulation is restored in the room by a fresh supply of heat to the radiators. This correction is not only temporary, but produces the overheated situation noted above. With a system of this type, it is accordingly impossible to maintain a continuous balance between heat loss and heat supply and therefore a close regulation of the desired temperature, because there is no control factor which is intimately and directly affected by changes in outside weather conditions which determines the rate of heat loss.

Attempts to solve the above problem generally have taken two forms. In one type, controlling devices have been connected through small diameter tubes to bulbs respectively exposed to the heating fluid and to the outside air, the bulbs and tubes being filled with a heat expansible liquid whose pressure changes as the temperatures to which they are subjected vary. Such an arrangement is responsive to temperature changes only and is incapable of responding to variations in heat loss on windy days due to the negligible heat conduction along the small diameter tubes. In the second type, the outdoor control is associated with means for producing heat electrically in such a manner that the rate of heat dissipation of the heat will vary with wind and outside temperature changes and will exercise a compensating control on the heating system. Both of these arrangements, however, are relatively costly and not within reach of the owners of small homes.

It is therefore one object of my invention to devise a heating system which is arranged for close regulation of the heat demand in the space being heated in accordance with outdoor weather changes by correlating the effect of outdoor and system fluid temperatures.

A further object is to provide a heating system having the foregoing characteristics which is further conditioned for response to the increased heat demands which occur on windy days during the heating season.

A further object is to provide an outdoor control for regulating a heating system in which the operation of a circuit controlling switch mechanism is determined by simultaneously exposing opposite ends of a heat conducting casing to the heating fluid and the outside air, the heat conditioning of the casing by these temperatures determining the extent of the control and the device being therefore responsive to outdoor temperature and wind variations.

These and further objects of the invention will be set forth in the following specification, reference being had to the accompanying drawings and the novel means by which said objects are effectuated will be definitely pointed out in the claims.

In the drawings:

Fig. 1 is a schematic, isometric elevation of a one-pipe, hot water heating system equipped in accordance with one phase of the invention and in which the circulating pump runs continuously during the heating season.

Fig. 2 is a diagrammatic, sectional elevation of a solenoid operated valve which operates as a flow control member in the system shown in Fig. 1.

Fig. 4 is a view similar to Fig. 1, but showing a variant arrangement of the heating system and the controlling electrical circuit therefor, the firing means for the boiler being regulated by the outdoor control and the circulating pump being controlled by a room thermostat.

Fig. 5 shows a modified, electric controlling circuit which may be used in connection with the heating system shown in Fig. 4, the pump and firing means being regulated by the outdoor control.

Fig. 6 is a sectional elevation of a modified form of outdoor control which may be employed with the systems shown in Figs. 1 and 4 and which utilizes a gas or liquid filled casing that is responsive to outside weather conditions and the heating fluid.

Fig. 7 is a section along the line 7—7 in Fig. 6.

Fig. 8 is a sectional elevation showing a further modification of the outdoor control using a gas or liquid filled casing as in Fig. 5 and associating this casing with a Bourdon tube and switching elements.

Figure 3:
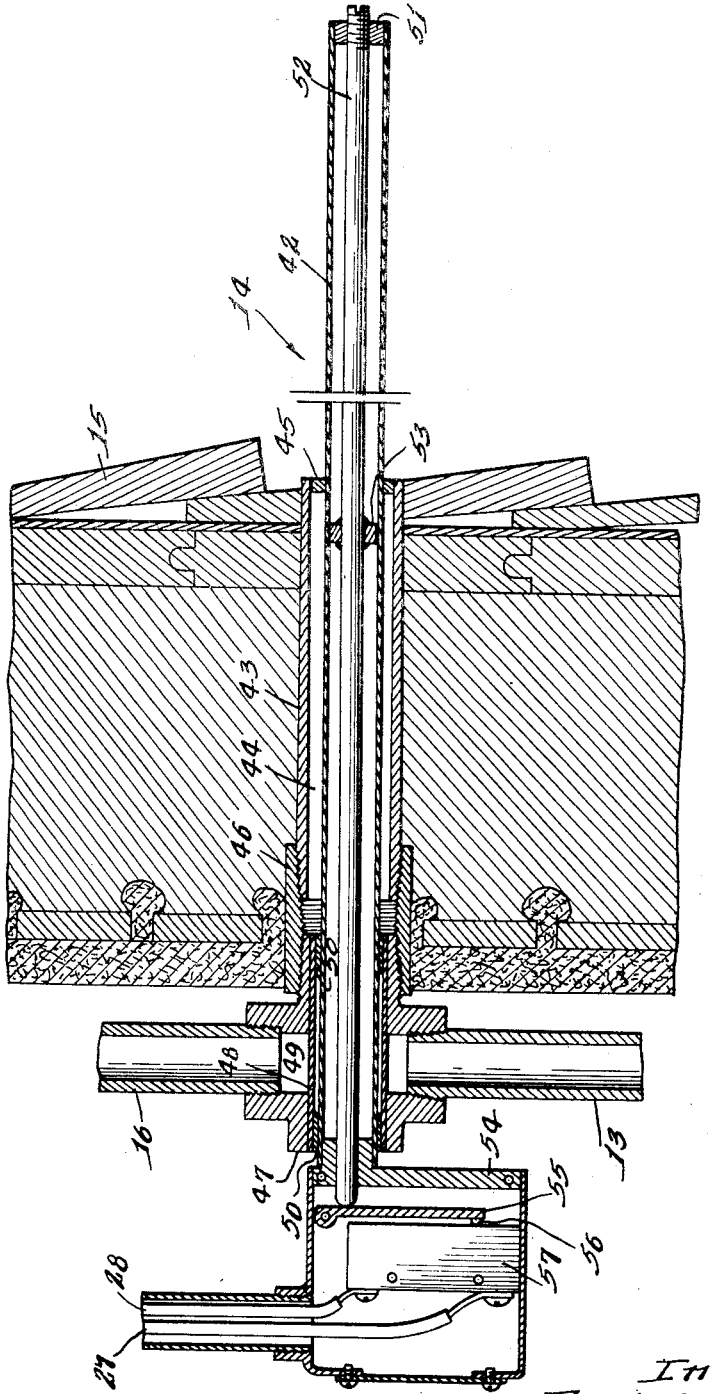
Fig. 3 is an enlarged, sectional view of the outdoor control employed in Fig. 1.

Referring to Figs. 1 and 2, the numeral 10 designates a hot water heating boiler from which leads a supply pipe 11 in which is interposed a flow control element in the form of an electrically operated valve, denoted generally by the numeral 12. By way of example, this valve is indicated as being of the solenoid operated type, but a motor operated valve may be used if desired, many types of the latter valve being well known in the art. On the discharge side of the valve 12, a pipe 13 connects the pipe 11 with the water inlet of an outdoor control 14 which extends through the building wall 15 a distance sufficient to insure that its outside extremity will be subject to weather changes, although as presently noted the position of the control is capable of being varied. The water outlet of the control 14 is connected by a pipe 16 with the pipe 11, the water inlet and outlet being located inwardly of the wall 15. To insure adequate water flow through the inner end of the control so that the regulating action of the latter will be accurate and substantial, the pipes 13 and 16 are connected to the pipe 11 by fittings 17 which are specially designed for one-pipe systems and embody the principles outlined in United States Letters Patent, No. 1,663,271, dated March 20, 1928.

The pipe 11 is connected to any desired number of radiators, such as 18, and each radiator is connected by supply and return pipes 19 and 20 to the pipe 11 through fittings 17 for reasons noted in connection with the control 14. The return portion of the pipe 11 delivers the water to an electrically operated pump 21 whose discharge side is connected by a pipe 22 with the boiler and by a pipe 23 with the pipe 11 between the discharge side of the valve 12 and the connection of the pipe 13 with the pipe 11. Hence, when the valve 12 is closed, the pipe 23 serves as a by-pass around the boiler 10, all water then being circulated through the pipe 23 by the pump 21 which runs continuously during the heating season.

Associated with the above piping is an electric circuit which includes the outdoor control 14 as a part thereof and which will now be described. Power wires 24 and 25 are connected to a main switch 26 and from the switch a wire 27 leads to the control 14 whose interior construction is more particularly illustrated in Fig. 3 and will be presently described. A wire 28 connects the control 14 with a room thermostat 29 positioned to be affected by the radiator 18 and a wire 30 connects the thermostat with a solenoid coil 31 (see Fig. 2) operably related to the stem 32 of a valve element 33 which controls flow through the valve 12. The coil 31 is also connected by a wire 34 with the switch 26, the control 14, thermostat 29 and the electrical portion of the valve 12 being therefore arranged in series so that when the control and thermostat are closed, the valve 12 is open to permit hot water to flow from the boiler.

Bridged around the valve 12 is a circuit which includes in series relation a high limit or safety "aquastat" 35 mounted in the boiler and responsive to the boiler water temperature, and automatically operated, firing means 36 for the boiler which may be a gas or oil burner, or a mechanical stoker. The "aquastat" 35 is connected by a wire 36 with the wire 30, while a wire 37 connects the "aquastat" with the firing means and the latter is connected by a wire 38 with the switch 26. Since the "aquastat" 35 is always closed under normal operating conditions, it will be obvious that the firing means 36 will be operated simultaneously with the opening of the valve 12 when the thermostat 29 is closed since the firing means and the valve, respectively, are electrically in series with the thermostat 29 and the control 14. Operation of the pump 21 is determined by a switch 39 which controls a circuit supplied by power wires 40 and 41.

The control 14 constitutes an important part of the invention and its essential features are illustrated in Fig. 3 to which reference will now be made. Specifically, the control 14 comprises a tubular casing 42 composed of a metal having a relatively high coefficient of expansion, such as brass or copper, which extends through the wall 15 with its opposite ends projecting beyond opposite sides of the wall, this being the specific position shown in Fig. 1, but is not a limiting position. The casing 42 may be heat shielded from the wall by an enclosing sleeve 43 whose length is almost equal to the thickness of the wall and which is spaced from the casing to provide a dead air chamber 44. The outside end of the sleeve 43 is closed by an annulus 45 while the other end is threaded in one end of a pipe coupling 46 whose opposite extremity terminates at the inner surface of the wall 15. A sleeve composed of suitable insulating material may be substituted for the dead air space if desired.

Threaded in the inner end of the coupling 46 and surrounding the same end of the casing 42 is a header 47 in which are respectively threaded the outlet and inlet ends of pipes 13 and 16. A copper sleeve 48, or one having equal heat conducting properties, extends through the header 47 in concentric and spaced relation to the casing 42, thus forming internally of the header an annular chamber 49 which communicates with the pipes 13 and 16. A frictional, heat conducting fit between the casing 42 and sleeve 48 is achieved by split, copper bushings 50—50 which are inserted in the ends of the sleeve. Hence, since water flowing through the pipes 13 and 16 bathes an intermediate, external portion of the sleeve 48 which in turn is in heat conducting relation to the inner end of the casing 42 through the bushings 50, the casing is constantly exposed at its opposite ends to the temperature of the heating fluid flowing through the system and to outside weather conditions, respectively.

The outer end of the casing 42 is closed by a plug 51 secured thereto and threaded through this plug is the slotted outer end of a rod 52, preferably composed of a non-expansible material such as Invar which extends through the casing in coaxial relation thereto and is guided internally thereof by a collar 53 fast on the rod. The inner end of the rod 52 is slidable through the adjacent wall of a switch housing 54 secured to the casing 42 and is operably related to an intermediate portion of a rock lever 55 pivoted interiorly of the housing 54 and having its free end actuatingly related to a plunger 56 forming part of a snap action switch 57 to which are connected the wires 27 and 28. The switch 57 is preferably of the type which requires only a very slight movement to shift the switching element from a first to a second position and when the actuating force is removed, the element automatically returns to the first position. A switch of this type is disclosed in United States Letters Patent No. 1,960,020, dated May 22, 1934, and its essential details are shown in Fig. 7 of this application, with the exception that in the Fig. 3 construction, as in the patented switch, the plunger 56 is moved inwardly and outwardly of the switch to make and break the circuit therethrough while the reverse situation is true in the form shown in Fig. 7.

From the foregoing, it will be understood that, since the casing 42 is free to lengthen and shorten in response to the mutually modifying actions of the circulating heating fluid and the outside temperature and general weather conditions and since these length changes effect movements of the connected rod 52 due to its substantially zero expansion coefficient, means are thus provided for regulating the heating system. The control may be adjusted to meet different operating conditions by changing the relative positions of the casing 42 and rod 52 by screwing the rod inwardly or outwardly of the casing, or by varying the length of the casing exposed to the outside weather through slipping the casing inwardly or outwardly of the wall 15, or by a combination of these factors, and including positions in which the outer end of the control does not project beyond the outer surface of the wall. In the latter instance, the outside weather acts through the building wall to condition the outer end of the control 14.

It will be assumed that the control 14 has been adjusted to maintain a desired temperature condition in the space to be heated; this adjustment once made for an installation need not be disturbed for thereafter its operation is automatic. So long as heat is not required indoors, for example during the summer season, the control 14 and the thermostat 29 are open, the valve 12 and the "aquastat" 35 are closed, and the firing means 36 is not operating. Under these conditions, the control 14 is open because the outside temperature is such that the casing 42 has lengthened sufficiently to open the switch 57. The switch 39 is also open so that the pump 21 is not running.

When the outdoor temperature falls to a point at which heat is required indoors, for example, at the beginning of the heating season when the boiler is cold, the switch 39 is closed thus initiating a flow of water through the system. This switch may be closed manually, or automatically by an outdoor thermostat set to close at an outside temperature which will insure that the pump runs continuously during the heating season, and the diagrammatic illustration of the pump circuit in Fig. 1 is intended to be generically inclusive of either arrangement. Due to the drop in the outside temperature, the casing 42 shortens enough to close the controlling circuit through the switch 57, and the thermostat 29 is closed since it is then demanding heat. The control circuit is therefore completed so that the valve 12 opens to permit flow through the boiler 10 and the firing means 36 begins operating.

As the temperature of the water in the system rises, the heat thereof is applied to the inner end of the casing 42 and is conducted therealong towards the colder, outer end of the casing. This heat conductance provides the control factor for the system and it will be obvious that its rate will be higher on cold than on mild days, and, further, that the dissipation of heat at the outdoor end of the casing will be higher on windy than on still days even though the windy and still days may register the same temperature on a thermometer. In other words, a higher water temperature in the system will be required to open the switch 57 on cold days than on milder days and a comparable situation will exist on windy, cold days in relation to still, cold days. The hot and cold ends of the casing 42 may be regarded as mutually modifying forces whose actions are correlated or coordinated by the casing to produce an efficient control on the system which substantially balances the heat supply and the heat loss under variant weather conditions.

For example, under the conditions mentioned above and assuming an outside temperature of 65° F., a water temperature of 90° F. may be sufficient to interrupt the circuit, thus closing the valve 12 and stopping the firing means 36, even though the thermostat 29 is not satisfied. However, the heat then in the system continues to be circulated through the radiators since the pump runs continuously and moves the water through the bypass 23. As heat is dissipated in the space being heated, this condition is reflected in a lowered water temperature at the inner end of the control 14 and therefore a contraction of the casing 42. Hence, the control 14 again closes to cause a fresh supply of hot water from the boiler 10 to enter the system, this supply being slightly tempered by the relatively colder water moving through the bypass 23. Eventually, the rise in system water temperature effects an opening of the control 14 with accompanying results as noted above. These repeated supplies of hot water from the boiler continue until the thermostat 29 is satisfied and thereafter heated water always courses through the system, thus eliminating stratification of air in the space being heated and avoiding the possibility of a "cold 70°" condition.

If the outdoor temperature drops to 0° F., the firing means 36 will operate and the valve 12 will open for longer periods to thereby establish the higher water temperature required to satisfy the increased heat demand in the space and the control 14 before the latter opens.

It is contemplated that the thermostat 29 would be used in well insulated buildings and might be omitted in those where the heat loss is more rapid and, in the latter case, the control 14 would determine directly the operation of the valve 12 and the firing means 36.

The foregoing means of control effectively anticipates heat demands in the space under all weather conditions and due to the principle of coordinating heat conduction along the casing 42, it is characterized by the outstanding advantage relative to bulb systems of control of compensating for increased heat losses on windy days. Further, the control 14 is more compact than the bulb arrangement and is capable of easier associtaion with a heating system.

The one-pipe modification illustrated in Fig. 4 differs generally from that shown in Fig. 1 in that the firing means is directly regulated by the outdoor control, while the operation of the pump is controlled by a room thermostat. In the former figure, the numeral 58 designates a hot water heating boiler from the upper part of which extends a supply pipe 59 which includes a flow control valve 60 of the well known type which is gravity actuated to closure and which opens in response to pump pressure. The pipe 59 supplies hot water to any number of radiators, such as 61, each of which is connected to the pipe 59 through fittings 62 which function in the same manner as the fittings 17. The return portion of the pipe 59 feeds water to the bottom of the boiler through a motor driven pump 63. One end of a pipe 64 is connected to the pipe 59 on the inlet side of the valve 60 and the opposite end is connected to the inner end of an outdoor control 65 which is identical with the control 14 and extends through and beyond the outer surface of a building wall 66. The pipe 64 may be vented by a vent valve 64ª. The hot water circuit through the control 65 is completed by a pipe 67 which connects with the return portion of the pipe 59 and which preferably includes a restricting valve 68 to prevent short circuiting through the control when the pump is running.

The electrical portion of the system comprises power wires 69 and 70 which are connected to a main switch 71 from which a wire 72 leads to the control 65. A wire 73 connects the control with firing means 74 through a high limit or safety "aquastat" 75 responsive to boiler water temperature and which opens when this temperature exceeds the setting of the "aquastat" and a wire 76 completes the firing means circuit to the switch 71. A wire 77 also connects the switch 71 to a room thermostat 78 positioned to be affected by the radiator 61 and the thermostat connects by a wire 79 which may include a manually operated switch 80 with the electrical driving part of the pump 63 and this part connects by a wire 81 with the wire 76 to complete the thermostatic circuit.

The control 65 per se functions in the same manner as does the control 14 in Fig. 1, but the general operation of the system shown in Fig. 4 differs in that, below the setting of the "aquastat" 75, the control 65 determines the operation of the firing means 74 and the thermostat 78 at all times controls the pump 63. When the latter operates, the flow control valve 60 is opened and hot water is forced through the radiating portion of the system and also through the pipe 64 to the inner end of the control 65 and thence through the pipe 67 to the return portion of the pipe 59. Hence, during pump operation, the control functions as a variable regulating device to determine the length of time that the firing means 74 operates dependent upon the outside temperature. When the pump is not working and the control 65 is closed, the "aquastat" 75 will interrupt the action of the firing means 74 when the temperature of the boiler water exceeds the setting of the "aquastat."

In Fig. 5 is illustrated a modified electrical circuit which may be used with the heating system shown in Fig. 4. Power wires 82 and 83 are connected to a switch 84, from which a wire 85 leads to an outside control 86, identical with the control 14, and from the control 86, a wire 87 leads to a motor driven pump 88 which in turn is connected by a wire 89 to the switch 84. A wire 90 which includes a high limit or safety "aquastat" 91 responsive to boiler water temperature connects the wire 87 with a boiler firing means 92 and the latter in turn connects by a wire 93 with the wire 89, so that the pump 88 and the firing means 92 are in parallel relation. Hence, with this arrangement, the control 86 simultaneously regulates the operation of the pump and the firing means below the setting of the "aquastat," but always controls the pump.

In Figs. 6 and 7 is illustrated a variant form of outdoor control which may be used in the systems above described as a substitute for the controls 14 and 65. This modification is similar to the latter controls in that it utilizes the coordinating action of variations in the outdoor and heating system fluid temperatures as applied to a heat conducting casing, but differs therefrom in that the temperature variations of the casing are reflected in pressure changes in a fluid sealed in the casing which affect a diaphragm actuated switch.

Specifically, this modification comprises a heat conducting casing 94, similar to the casing 42, which extends through a building wall 95 and is preferably insulated therefrom by a sleeve 96. A substantial portion of the casing projects beyond the outer surface of the wall for exposure to the outside weather and its outer extremity is closed by a plug 97. It will be understood, however, that the control casing 94 may have its position adjusted as described for the casing 14. The inner end of the casing 94 is mounted in an open top housing 98 located inwardly of the wall 95 and which includes a chamber 99 that communicates with the interior of the casing. The top of the housing 98 is closed by a diaphragm 100 clamped thereagainst by a frustoconical cover 101 and the casing 94 and chamber 99 are filled with a suitable gas or liquid sealed in at any desired temperature and pressure. Hence, the diaphragm 100 is responsive to pressure changes of the fluid in the casing 94. Air may be used as a fill, or any of the well known, heat expansible liquids which will not freeze at any of the outdoor temperatures to which the control might be subjected. Bridged across the chamber 99 and in heat exchanging relation with the fluid therein is a tube 102 (see Fig. 7) which is preferably composed of copper or a comparable heat conducting metal and which communicates with the ends of pipes 103 and 104 mounted in the housing 98 and connected to the heating system in accordance with the arrangements shown in Figs. 1 and 4.

A threaded stem 105 is fixed to the central part of the top surface of the diaphragm 100 and adjustable on the stem is a nut 106 having an extension 107 which is reciprocable through a hole 108 in the cover 101 and moves with the diaphragm. The extension 107 is intended to actuate a snap switch 109 which is preferably of the same general type as switch 57, except that upward movement of the diaphragm 100, corresponding to a lessened demand for heat, effects an opening of the switch 109, while a contrary movement, corresponding to an increased demand for heat, effects a closing of the switch.

The switch 109 comprises a housing 110 composed of insulating material and through whose bottom is slidably mounted a plunger 111 which is actuated upward by the extension 107. The upper end of the plunger is operably related to an electrically conducting, spring leaf 112 whose left end is secured to a shim 113 which abuts the cover of the housing 110 by means of a screw 114 in conducting relation to the spring leaf 112 and a wire 115 is connected to the screw. Integrally formed with the opposite or free end of the spring leaf 112 and extending in spaced relation on opposite sides and towards the fixed end of the leaf is a pair of members 116, each of which is shaped in the manner shown in Fig. 7, and the free end of each member freely seats within a socket 117 in the shim 113 so that the members may rock upwardly and downwardly relative to the shim. Only one of the members 116 is illustrated in Fig. 7. The switch is shown in closed position with the free end of the spring leaf 112 resting on a metallic block 118 secured to the bottom of the housing 110 by a screw 119 which is in electrically conducting relation to the block and to the screw one end of a wire 120 is connected. When the plunger 111 is moved upwardly, the spring leaf 112 is snapped upwardly to place its free end in contact with a block 121 secured to the cover of the housing 110 which is the open circuit position of the switch. This movement of the leaf spring 112 is permitted by a slot 121ª cut in the shim 113 which provides clearance for the flexing of the spring. When pressure on the plunger 111 is relieved sufficiently, the spring leaf 112 automatically returns to the closed circuit position shown in Fig. 7. For further structural details of the switch 109 and the theory of its operation, reference may be had to the last noted patent.

The control shown in Figs. 6 and 7 may be used with either of the heating circuits shown in Figs. 1 and 4, the wires 115 and 120 being connected to the electrical circuit of the former figure in the same manner as the wires 26 and 27, and in the latter figure in the same manner as the wires 72 and 73, or the wires 86 and 87 in Fig. 5. This control performs the same function in relation to a heating system as does the control shown in Fig. 3 and its general characteristics are the same, except that regulation is effected by pressure changes in the fluid enclosed in the casing 94 as the heat conditioning thereof varies with fluctuations in the temperatures, outdoor and heating medium, to which it is simultaneously subjected. Adjustment of this control is secured by the nut 106 and by varying the length of the casing 94 that is exposed outdoors.

A further form of outdoor control is illustrated in Fig. 8 which is similar to that shown in Figs. 6 and 7 in that control is exercised by pressure changes in a heat expansible fluid enclosed in a heat conducting casing subjected to the outside weather and the circulating fluid of the heating system, but differs therefrom in that the casing is associated with an extension in the form of a Bourdon tube whose free end is connected to a circuit controlling switch.

Referring to Fig. 8, the numeral 122 designates a heat conducting casing which extends through and projects beyond opposite sides of a building wall 123 and is insulated therefrom by a sleeve 124. The outer or weather end of the casing is closed and the opposite end extends through a housing 125 whose opposite ends are closed by plugs 126 and 127 which encircle the casing. Between the plugs, the housing 125 is annularly chambered, as at 128, and through this chamber flows heating system fluid in heat exchanging relation to the casing 122, the fluid being supplied and evacuated through pipes 129 and 130, respectively, which may be connected to the heating system as shown in Fig. 1 or 4.

The casing 122 extends beyond the plug 127 and is secured to one end of a Bourdon tube 131, this end therefore constituting the fixed end of the tube whose interior communicates with the interior of the casing. The tube may be enclosed in a suitable housing 132 and its free end is connected to one end of a metallic switch lever 133 pivoted at 134 in the housing. The lever carries an electrical contact 135 which when the lever is rocked to a closed position engages a fixed contact 136 supported by the housing 132. A fixed magnet 137, also carried by the housing, is disposed adjacent the free end of the lever to accelerate its movement in a direction to engage the contacts 135 and 136. Wires 138 and 139 connect the fulcrum 134 and the fixed contact 136, respectively, to the electrical circuits shown in Figs. 1, 4 or 5. Since the disclosure of the switch mechanism in the housing 132 is largely diagrammatic, it will be understood that the pivot 134, contact 136 and magnet 137 will be suitably insulated from the housing, and the lever 133 will also be insulated from the connected end of the tube 131.

The casing 122 and tube 131 are filled with a suitable gas or liquid which is sealed in the indicated members and its operating characteristics therefore will be similar to the Fig. 6 type, but modified by the tube 131. The circuit controlling lever 133 is shown in open position indicating satisfied heat demand in the space being heated. When the fluid in the casing 122 and tube 131 chills sufficiently to effect a contraction of the tube, the lever 133 will be rocked to close the contacts 135 and 136 and the ensuing action will depend upon the heating and electrical circuit with which the control is associated, i. e., Figs. 1, 4 or 5. Otherwise, the characteristics of this modification in relation to the heating system and its ability to coordinate the effects of the outside weather, including wind action, and the heating fluid temperatures on a heat conducting casing are identical with the form shown in Fig. 3. It is contemplated that the Fig. 8 modification, due to the use of a Bourdon tube and the connected lever, may be characterized by an increased mechanical advantage for the purpose of circuit control, relative to the form shown in Fig. 6. Adjustment is effected by varying the length of the casing 122 exposed to the outside weather as already noted. The Bourdon tube is regarded as the equivalent of any extensible chamber, such as a bellows, which encloses a fluid and one end of which is free to move in response to pressure variations in the fluid.

Figure 9:
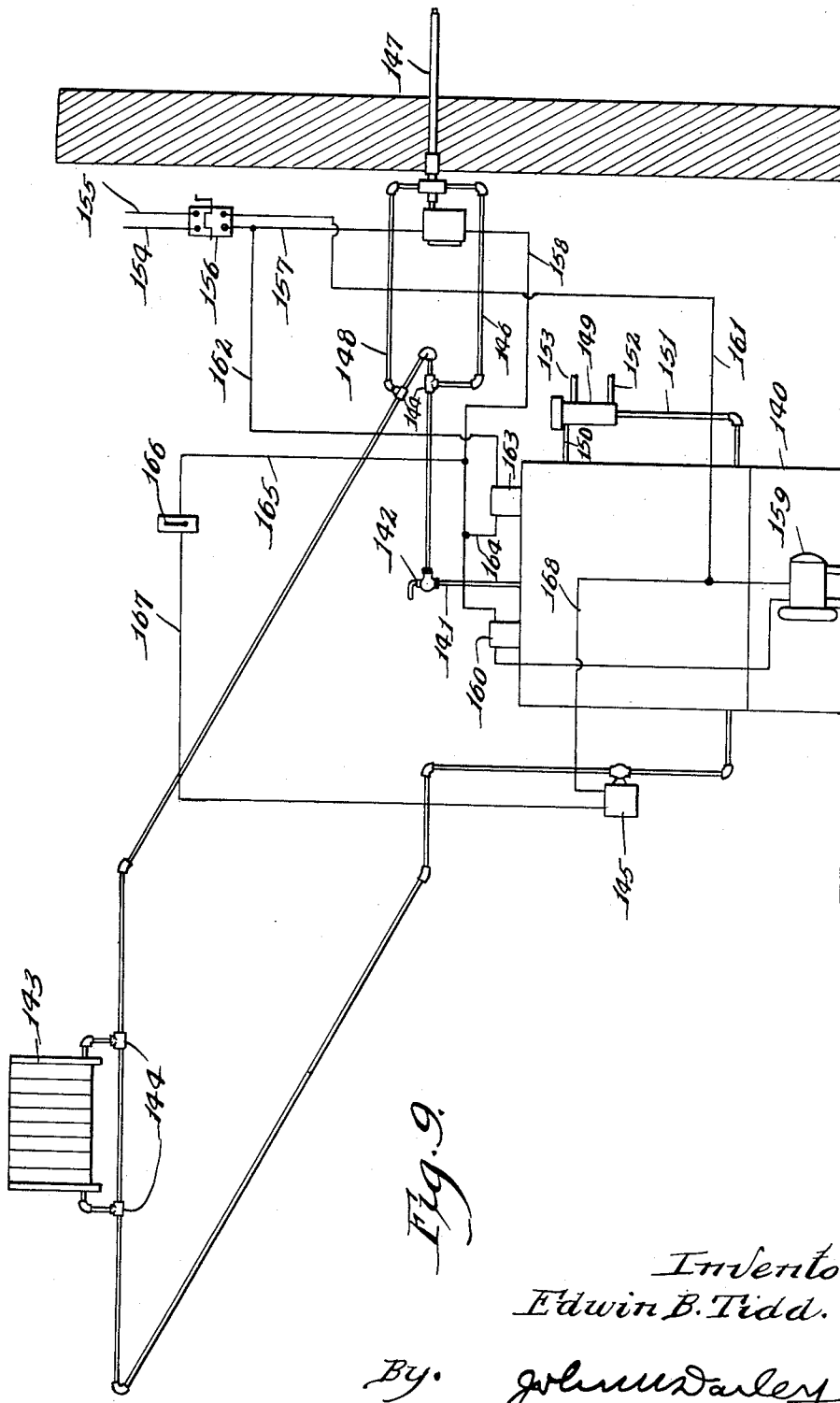
Fig. 9 is a view similar to Fig. 1, but showing a modification in which the boiler is arranged to provide heat for the radiators and service water, the firing means for the boiler being regulated by the outdoor control and the operation of the circulating pump being determined by the outdoor control and a room thermostat which are series related.

In Fig. 9 is illustrated the application of the control to a one-pipe, hot water heating system of the forcibly circulated type which also incorporates means for heating service water, the firing means being directly regulated by the outdoor control while the pump is in series with the control and a room thermostat.

Referring to Fig. 9, the numeral 140 designates a hot water heating boiler from the upper part of which extends a supply pipe 141 which includes a pump actuated, flow control valve 142, similar to the valve 60 in Fig. 4. The pipe 141 supplies hot water to any number of radiators, such as 143, each of which is connected to the pipe 141 by fittings 144, similar to the fittings 17. The return portion of the pipe 141 feeds water to the bottom of the boiler through a motor driven pump 145. One end of a pipe 146 is connected by a fitting 144 to the pipe 141 on the discharge side of the valve 142 and the opposite end is connected to the inner end of an outdoor control 147 which is identical with the control 14 and extends through the wall 66. The hot water circuit through the control 147 is completed by a pipe 148 which connects by a fitting 144 with the supply pipe 141 beyond the connection of the pipe 146 therewith in the direction of flow. Service water is heated by the boiler 140 in the customary manner, that is, by means of an exchange type of heater 149 connected to the boiler by pipes 150 and 151 and through which hot boiler water flows thermogravitationally or under the impulse of the pump. Water is supplied to the heater 149 through a pipe 152 and drawn through a pipe 153.

The electrical portion of the system shown in Fig. 9 comprises power wires 154 and 155 which are connected to a main switch 156 from which a wire 157 leads to the switch end of the control 147. A wire 158 connects the control with firing means 159 through a high limit or safety "aquastat" 160 having operating characteristics similar to the "aquastats" 35 and 75, and a wire 161 completes the firing means circuit to the switch 156. A wire 162 connects the switch 156 to a low limit "aquastat" 163 which is responsive to the temperature of the boiler water and which in turn connects by a wire 164 with the wire 158 so that the "aquastat" 163 is always in series with the firing means 159 through the "aquastat" 160. The "aquastat" 163 is set to maintain a minimum temperature of the boiler water to provide a reservoir of hot water for the heating system and for heating the service water. A wire 165 connects the wire 158 with a room thermostat 166 in such a way that the latter is in series with the switch portion of the control 147, the thermostat being positioned to be affected by the radiator 143, while a wire 167 connects the thermostat with the motor of the pump 145 which in turn connects by a wire 168 with the wire 161 to complete the pump electrical circuit.

The control 147 determines the operation of the firing means 159 below the setting of the "aquastat" 160, as in Fig. 4, and acting conjunctively with the room thermostat 166 also determines the operation of the pump 145. The "aquastat" 163 exercises independent control on the firing means below the setting of the "aquastat" 160.

Figure 10:
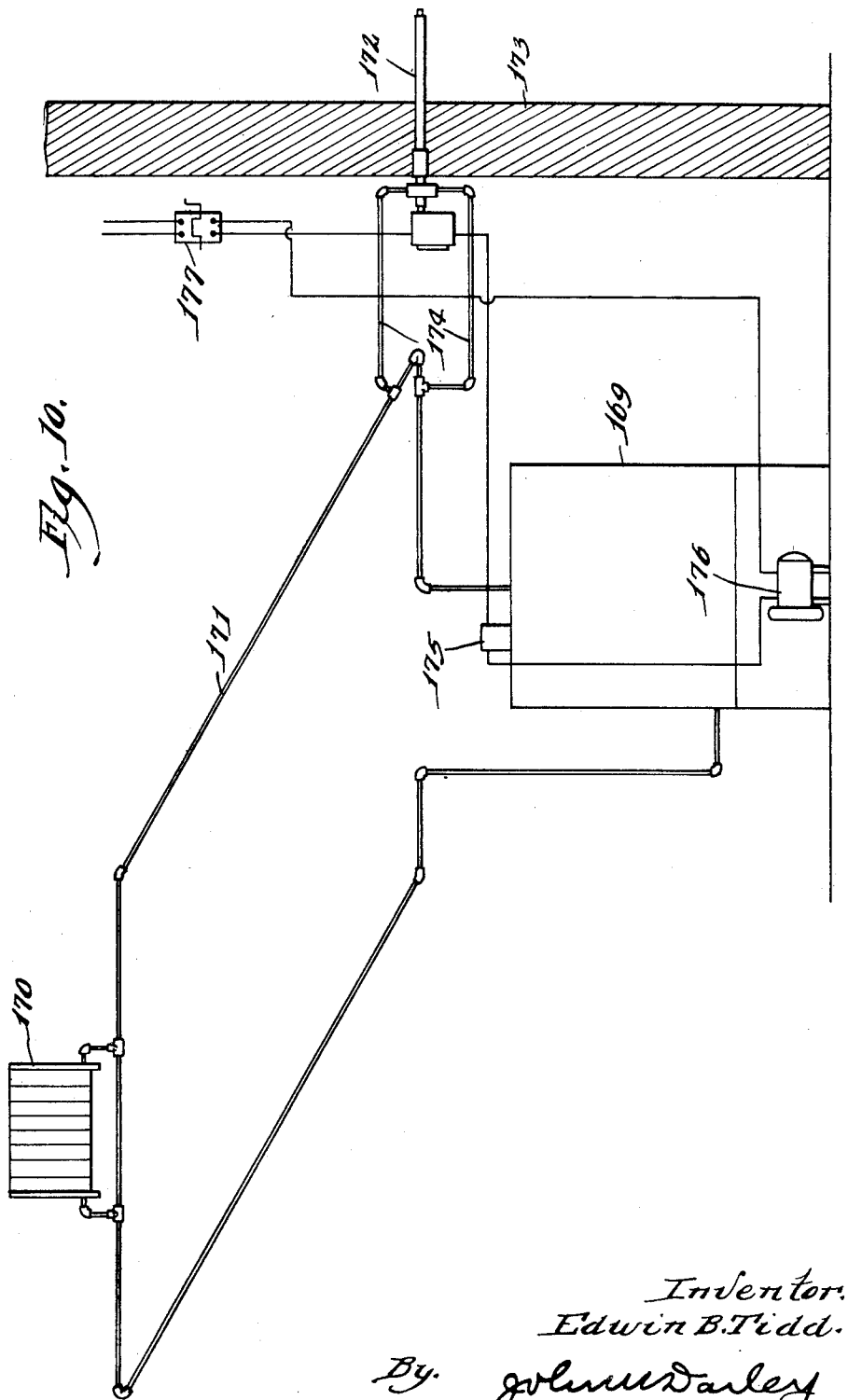
Fig. 10 shows a still further modification in which the heating system is of the thermogravitational type and the firing means is regulated by the outdoor control.

In Fig. 10 is illustrated the application of the outdoor control to a so-called gravity, one-pipe hot water heating system. The piping connecting the boiler 169 to the radiator 170 is identical with that shown in Fig. 9, with the exception of the flow control valve and circulating pump which are omitted, and this piping is designated by the numeral 171. The outdoor control 172, which is similar to the control 147, extends through the building wall 173 and its inner end connects with the piping 171 by a system of piping generally designated by the numeral 174 in the same manner as shown in Fig. 9. The electrical portion of this system is also identical with the comparable part of the electrical circuit illustrated in Fig. 9, i. e., the switch end of the control 172, the high limit "aquastat" 175 and the firing means are in series, power being supplied through a main switch 177. Regulation of the firing means 176 is exercised by the control 172 and hence the supply of heat to the heating system.

A heating system which is associated with any of the above outdoor controls according to the arrangements described will be conditioned to maintain an indoor temperature that is satisfactory for maximum body comfort. A substantial balance is maintained between heat supply and heat loss and whether the supply of heat to the system is continuous as in Fig. 1, or intermittent as in Fig. 4, there is always a sufficient amount of heat in the radiators to insure circulation of warm air in the room, thus preventing stratification. Closer regulation of the desired temperature in the room is therefore possible, as compared with the present indoor system of control, and heat demands which obviously vary with changes in the weather are efficiently handled by my improved control which anticipates the interior requirements for heat. Moreover, stand-by heat losses of the boiler are held to a minimum because the firing periods of the firing means are elastically related to the demands for heat in the space being heated, lower temperatures in the boiler being possible on mild days than on colder days, thus enabling certain economies in overall operation.

An outstanding feature of the invention is the use of a heat conducting casing or tube as the correlating factor between the outside temperatures and those of the heating fluid. The use of such a casing enables the structure to respond to increased heat demands on windy days since the dissipation of heat along the casing will clearly be greater than on still days even though the respective outdoor temperatures are identical. This variation in heat dissipation or rate of heat loss heat conditions the casing to provide the required control, regardless of the type employed.

Where any of the above controls are employed in a hand fired system, they would be connected to the boiler or furnace dampers for regulating the burning rate of the fuel.

I claim:

1. In a heating system for a building, the combination of a reservoir of heating medium, a circulating system connected to the reservoir for distributing the medium to the space to be heated, firing means for the reservoir, an outside wall forming part of the building, a heat conducting casing extending through the wall with its inner and outer ends respectively exposed for heat conditioning by the medium and outdoor weather, means for slidably mounting the casing in the wall to thereby vary the extent of heat loss from the inner to the outer end of the casing, and means responsive to variations in length of the casing effected by the conditioning thereof for determining the operation of the firing means.

2. In a heating system for a building, the combination of a reservoir of heating medium, a circulating system connected to the reservoir for distributing the medium to the space to be heated, firing means for the reservoir, an outside wall forming part of the building, an elongated casing extending through the wall and composed of a material having a relatively high coefficient of expansion with its inner and outer ends respectively exposed for heat conditioning by the medium and outdoor weather, means for slidably mounting the casing in the wall to thereby vary the extent of heat loss from the inner to the outer end of the casing, a rod composed of a material having a relatively low coefficient of expansion, one end of the rod being held by one end of the casing and the rod extending freely through the casing, and means operably related to the firing means and the free end of the rod and responsive to variations in length of the casing effected by the conditioning thereof for determining the operation of the firing means.

3. In a heating system for a building, the combination of a reservoir of heating medium, a circulating system connected to the reservoir for distributing the medium to the space to be heated, firing means for the reservoir, an outside wall forming part of the building, an elongated casing extending through the wall and composed of a material having a relatively high coefficient of expansion with its inner and outer ends respectively exposed for heat conditioning by the medium and outdoor weather, means for slidably mounting the casing in the wall to thereby vary the extent of heat loss from the inner to the outer end of the casing, means for insulating the casing from the wall so that the casing is substantially conditioned only by the medium and outside weather, a rod composed of a material having a relatively low coefficient of expansion, one end of the rod being held by one end of the casing and the rod extending freely through the casing, and means operably related to the firing means and the free end of the rod and responsive to variations in length of the casing effected by the conditioning thereof for determining the operation of the firing means.

4. In a heating system for a building, the combination of a hot water boiler, a piping system connected to the boiler for distributing the water to space heating elements, firing means for the boiler, an outside wall forming part of the building, a heat conducting casing extending through the wall with its outer end exposed to the outdoor weather, means for conducting the system water in heat exchange relation to the inner end of the casing, means for slidably mounting the casing in the wall and relative to the conducting means to thereby vary the extent of heat loss from the inner to the outer end of the casing, and means responsive to variations in length of the casing effected by the coacting temperatures at the ends of the casing for determining the operation of the firing means.

5. In a heating system for a building, the combination of a hot water boiler, a piping system connected to the boiler for distributing the water to space heating elements, firing means for the boiler, an outside wall forming part of the building, an elongated, heat conducting casing extending through the wall and composed of a material having a relatively high coefficient of expansion and with its outer end exposed to the outdoor weather, means for conducting the system water in heat exchanging relation to the inner end of the casing, means for slidably mounting the casing in the wall and relative to the conducting means to thereby vary the extent of heat loss from the inner to the outer end of the casing, a rod composed of a material having a relatively low coefficient of expansion, one end of the rod being held by one end of the casing and the rod extending freely through the casing, and means operably related to the firing means and the free end of the rod and responsive to variations in length of the casing effected by the coacting temperatures at the ends of the casing for determining the operation of the firing means.

6. In a heating system for a building, the combination of a reservoir of heating medium, a circulating system connected to the reservoir and including supply and return piping and a radiator in the space to be heated connected to the piping, a thermostat positioned to be affected by the radiator, pump means responsive to the thermostat for circulating the medium through the system, firing means for the reservoir, an outside wall forming part of the building, a heat conducting casing extending through the wall with its inner and outer ends respectively exposed for heat conditioning by the medium and outdoor weather, means for slidably mounting the casing in the wall to thereby vary the extent of heat loss from the inner to the outer end of the casing, and means responsive to variations in length of the casing effected by the conditioning thereof for determining the operation of the firing means.

7. In a heating system for a building, the combination of a reservoir of heating medium, a circulating system connected to the reservoir for distributing the medium to the space to be heated, pump means for circulating the medium through the system, firing means for the reservoir, an outside wall forming part of the building, a heat conducting casing extending through the wall with its inner and outer ends respectively exposed for heat conditioning by the medium and outdoor weather, means for slidably mounting the casing in the wall to thereby vary the extent of heat loss from the inner to the outer end of the casing, and means responsive to variations in length of the casing effected by the conditioning thereof for determining the operation of the pump and firing means.

8. In a heating system for a building, the combination of a reservoir of heating medium, a circulating system connected to the reservoir for distributing the medium to the space to be heated, a flow control valve for determining flow from the reservoir through the circulating system, firing means for the reservoir, an outside wall forming part of the building, a heat conducting casing extending through the wall with its inner and outer ends respectively exposed for heat conditioning by the medium and outdoor weather, means for slidably mounting the casing in the wall to thereby vary the extent of heat loss from the inner to the outer end of the casing, and means responsive to variations in length of the casing effected by the conditioning thereof for determining the operation of the firing means and the valve.

EDWIN B. TIDD.

REFERENCES CITED

The following references are of record in the file of this patent:

UNITED STATES PATENTS

| Number | Name | Date |
|---|---|---|
| 1,022,188 | Geissinger | Apr. 2, 1912 |
| 1,358,073 | Fulton | Nov. 9, 1920 |
| 1,826,100 | Stewart | Oct. 6, 1931 |
| 1,981,679 | Stem | Nov. 20, 1934 |
| 2,037,155 | Stuart | Apr. 14, 1936 |
| 2,067,959 | Wasson | Jan. 19, 1937 |
| 2,125,839 | Wasson et al. | Aug. 2, 1938 |
| 2,164,882 | Miles | July 4, 1939 |
| 2,181,480 | Gillett | Nov. 28, 1939 |
| 2,211,573 | McGrath | Aug. 13, 1940 |
| 2,268,083 | Rapuano | Dec. 30, 1941 |
| 2,282,013 | Wetzsteon | May 5, 1942 |
| 2,290,985 | McElgin | July 28, 1942 |

FOREIGN PATENTS

| Number | Country | Date |
|---|---|---|
| 684,535 | Germany | Nov. 30, 1939 |